United States Patent [19]

Skibowski

[11] Patent Number: 4,790,568

[45] Date of Patent: Dec. 13, 1988

[54] APPARATUS FOR SELECTIVE COMBINATION OF AT LEAST ONE FIRST STATIONARY PIPELINE FOR LIQUIDS WITH A PLURALITY OF SECOND STATIONARY PIPELINES

[75] Inventor: Hubert Skibowski, Hamburg, Fed. Rep. of Germany

[73] Assignee: Dover Corporation, New York, N.Y.

[21] Appl. No.: 891,541

[22] Filed: Jul. 31, 1986

[51] Int. Cl.⁴ .............................................. F16L 39/00
[52] U.S. Cl. ....................................... 285/28; 285/27; 285/131; 285/137.1
[58] Field of Search ....................... 285/24, 27, 5, 405, 285/25, 28, 67, 131, 136, 137.1

[56] References Cited

U.S. PATENT DOCUMENTS

| | | | |
|---|---|---|---|
| 2,486,120 | 8/1945 | Colton et al. | 285/143 |
| 3,260,539 | 2/1965 | Herron | 285/24 |

FOREIGN PATENT DOCUMENTS

| | | | |
|---|---|---|---|
| 264936 | 9/1968 | Austria | 285/325 |
| 2847901 | 5/1980 | Fed. Rep. of Germany | 3/2 |
| 1566884 | 5/1969 | France . | |
| 302653 | 1/1955 | Switzerland | 285/192 |
| 1360863 | 7/1974 | United Kingdom . | |
| 1566599 | 5/1980 | United Kingdom | 285/137.1 |

Primary Examiner—Randolph A. Reese
Assistant Examiner—Anthony Knight
Attorney, Agent, or Firm—John B. Schenk

[57] ABSTRACT

An apparatus for selective combination of at least one first stationary pipeline for liquids with a plurality of second stationary pipelines by means of a movable pipeline connection and a coupling system, wherein the first and second pipelines have each a movable connecting pipeline which at the free end contains a connecting head, the connecting heads of the first pipelines being guided by means of first guides along parallel first axes and the connecting heads of the second pipelines being guided by means of a second guides along parallel second axes which extend perpendicularly to the first axes, the connecting heads having wound off end portions, the ends of which hold first coupling parts having front surfaces all lying in approximately one coupling plane, the second coupling parts have a circular radial retaining edges and the first coupling parts have a coupling annular segment with a radial flange section extending only over an arch length of 180 degrees or less and gripping back the retaining edge of the second coupling part when the front surfaces of interacting coupling parts are close to each other.

9 Claims, 3 Drawing Sheets

APPARATUS FOR SELECTIVE COMBINATION OF AT LEAST ONE FIRST STATIONARY PIPELINE FOR LIQUIDS WITH A PLURALITY OF SECOND STATIONARY PIPELINES

An apparatus for selective combination of at least one first stationary pipelines for liquids with a plurality of second stationary pipelines by means of a movable pipeline connection which, via detachable coupling assemblies, interacts with the first and the second stationary pipelines, wherein said coupling assemblies have first coupling parts and second coupling parts. The second coupling parts having a circular radial retaining edge, the first coupling parts having a coupling annular segment with a radial flange section extending only over an arch ength of 180 degrees or less and holding back the second coupling part when the front surfaces of interacting coupling parts are jointly moved along approximately in a common plane and then lie close against each other.

In the mineral oil industry, or in many other fields of chemistry or research techniques, the problem arises of combining a first number of stationary pipelines with a number of second stationary pipelines. The combination must be such that any desired first pipeline can be combined with any desired second pipeline—also overlapping in time, if possible. This has traditionally been done by means of connecting hoses, hinged brackets, etc., which are connected to the ends of the first and the second pipelines. The connecting pipelines are often firmly coupled with the first or with the second pipelines, while they can be selectively coupled with any desired second or first pipeline. The connection itself is made by operating personnel so that the coupling part at the free end of a connecting pipeline is coupled in any desired manner with the coupling part of a stationary pipeline. Such an arrangement has a few disadvantages.

The manipulation of the connecting hoses, in the first place, consumes extraordinary strength at high nominal widths. It can also be abnormally dangerous for the operator when a coupling he has made separates. He can be hit by the connecting hose that has been set in motion by the shock and receive injuries. He can also come into contact with the liquid, which is very risky in case of corrosive, poisonous or similarly dangerous substances.

The traditional distributors cannot be automatically operated and most of them cannot be continuously scraped.

Another disadvantage of the traditional distributors consists in that defective pipeline connections can be inadvertently made. Under certain circumstances, this has considerable effects on the production process and can cause an expense corresponding to the amount of product lost and/or production equipment that becomes useless. In addition, production time is lost. Therefore, it is also known to provide supervisory equipment that indicates a defective pipeline connection or allows the passage of a medium only when there is a corresponding positive signal from the supervisory equipment.

A distributor apparatus has become known wherein several second coupling parts are stationarily situated in a manner such that adjacent stationary coupling parts are equally distant from each other, respectively, and their front surfaces lie on one plane, and wherein two first coupling parts with coupling annular segments are mounted on the ends of a 180 degree manifold arc and have a distance from each other corresponding to the distance of adjacent stationary second coupling parts (German Pat. No. 3,210,558). In such a distributor apparatus, normally only two pipelines can be combined at a time. A further condition is that the ends of the pipeline each be approximately on one plane. Finally, the known distributor apparatus likewise requires manipulation, even if simplified, by auxiliary personnel.

The above cited publication also has disclosed a distributor apparatus in which several stationary second coupling parts are arranged in a circle and having their front surfaces on one plane, in which another coupling part, which is constantly rotatably coupled with another coupling part situated at the end of a 180 degree bend of a tube, is stationarily situated in the center of the circle. A first coupling part being mounted on the other free end of the tube bend that can be selectively connected with one of the stationary second coupling parts. In such a distributor apparatus, only one first pipeline is always selectively combined with one of several second pipelines. An enlargement, in the sense that several first pipelines can be selectively combined with several second pipelines, is not possible.

The last two mentioned apparatus for distributors use through-type couplings that have front surfaces snugly and closely abutting on each other, the first coupling part having a coupling annular segment that extends only over an arch length of 180 degrees or less and has a radial flange section which grips back a radial retaining edge of the second coupling part. The invention is based on the problem of providing a continuously scrapable apparatus for liquid for selective combination of at least one first stationary pipeline with a plurality of second stationary pipelines by means of a movable pipeline connection, making possible a simple and quick pipeline combination without using additional manipulation, which also is suitable for automatic production of pipeline connections.

According to the invention, this problem is solved by the fact that the first and second pipelines each have a movable connecting pipeline which, at the free end, contains a connecting head. The connecting heads of the first pipelines being guided along parallel first axes by means of first guides and the connecting heads of the second pipelines being guided along parallel second axes by means of second guides that extend perpendicularly to the first axes. The connecting heads have wound off end portions, the ends of which hold the first coupling parts or the second coupling parts in such a manner that all the front surfaces are approximately on one coupling plane.

It is essential to the invention that a movable connecting pipeline, the head of which is movable along a straight axis by means of a guide, be connected with each stationary pipeline. Since the axes of the first and second connecting heads stand perpendicular in respect to each other, there is respectively a coupling point or coupling position in which the front surfaces of the coupling parts are opposite to each other for a first and a second connecting pipeline or the coupling part thereof. Thus, if in a desired pipeline combination the connecting heads of the corresponding connecting pipeline move to the same extent that their common connecting point has moved from the starting line, both connecting heads or the connecting parts thereof automatically arrive at the aligned position. The first coupling part has a coupling annular segment that interacts with a retaining edge of the second coupling part. It is obvious that the annular segment must be positioned in a manner such that it can grip the retaining edge when the coupling parts move together in directions that are 90 degrees offset.

In the apparatus according to the invention, the coupling positions are on the joints of a grid or the intersection points of a matrix. If the connecting heads are designed in such a manner that the coupling front surfaces have a sufficient distance from their guide, any desired number of combinations can be made without the connecting heads hindering each other.

The distributor apparatus according to the invention has a series of considerable advantages.

The individual coupling positions or points can be very narrowly drawn together so that the total space needed is extremely small. Besides, in case an adjustment of the connecting pipelines take place, the coupling range needs not be inspected either automatically or by means of power drives. The risks to the operators are thus eliminated.

The distributor apparatus according to the invention is adequate for completely automatic production of pipeline combinations. If the corresponding pipelines are duly controlled, correct couplings also automatically result. To that extent, the formation of defective pipeline combinations is eliminated. Additionally, supervisory measuring devices are not necessary.

A specially space-saving embodiment of the invention provides that the first and second axes be both in one plane. Besides, the first and second axes are preferably the same distance from each other. The distance of the axes is determined by the smallest distance from each of the other guides.

An embodiment of the invention provides that the connecting pipelines be hoses which have a loop between the corresponding stationary pipeline and the connecting head, when the connecting head is not in the fully extended position. In this embodiment, the connecting head itself must interact with the guide in order that the accessory coupling part be guided in the coupling plane by its front surface. The hose loop ensures that each time a sufficient hose is supplied in order that all coupling positions can be entered into.

An alternative embodiment provides that the connecting pipelines have telescopic tubes. In case of small nominal widths, the telescopic tubes guiding can be affected by the tubes themselves if the working range of the extended telescopic tube part is not too large. In case of extensive working ranges or large nominal widthes, the connecting head is conveniently guided along the coupling plane around the front surfaces of the coupling parts.

Finally, hinged tube connections can also be used in order to make the connecting heads movable. But it is advantageous if a detent is provided for all movable connecting pipelines, in the respective coupling positions, that prevents the coupling parts from moving away from each other. A detent of the coupling parts is not directly required.

According to another embodiment of the invention, a driving mechanism, coupled with each connecting head, is connected with a control device in a manner such that each connecting head is movable along its adjustments axis toward the respective coupling points. The control device regulates the respective driving mechanisms in such a manner that the connecting heads are synchronously moved. The greatest length of cycle corresponding to the spacing of two coupling points. The control device can include a mechanism or electronic timing device.

The special design of second and first coupling parts accordingly requires that one of the two coupling parts necessarily reaches the coupling position first. In an embodiment of the invention, the control device brings the second coupling parts into the coupling position before the corresponding first coupling part.

Different constructional solutions are offered for guiding the connecting heads. One of them, according to the invention, consists in that the first and second guides have parallel rails on which the connecting heads are guided slidingly or rollingly. Alternatively, the first and second guides can be formed of parallel roller paths on which the connecting heads are guided as they roll.

The invention is explained in detail herebelow with reference to drawings.

Figure 1:
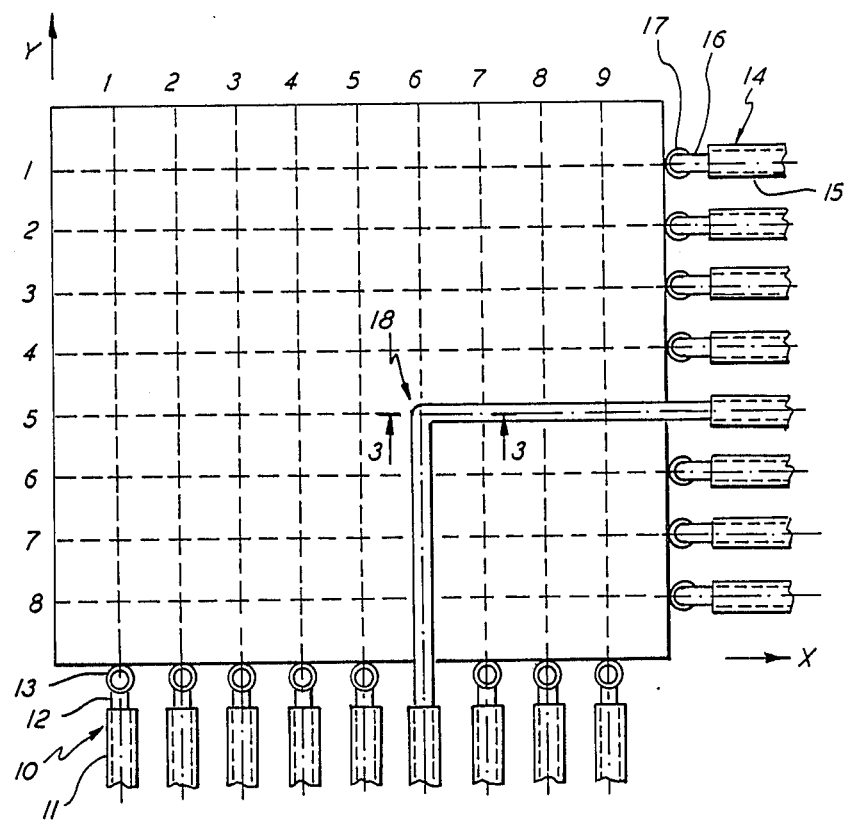
FIG. 1 shows, diagrammatically, an illustration of the distributor apparatus according to the invention.

FIG. 1 shows a first group of telescopic tubes 10 with a stationary outer tubes 11 and a movable inner tubes 12. The movable tubes 12 are bent on the free end to form a 90 degree arch, and have a coupling part 13. Let it be assumed that the telescopic tubes 12 are beneath the level of the drawing. Front surfaces of the coupling parts 13 are then on the plane of the drawing. All telescopic tubes 12 are adjustable in the direction of the Y axis.

A second group of telescopic tubes 14 has stationary tubes 15 and movable tubes 16. The stationary tubes 15, the same as the stationary tubes 11, are each connected with a stationary pipeline in a manner not shown. The movable tubes 16 are bent at the ends to form a 90 degree arch. Let it be assumed that the tubes 16 are above the level of the drawing, then the front surfaces of the coupling parts 17, at the ends of the tubes 16, are on the plane of the drawing. The movable tubes 16 are adjustable in the X direction.

It is to be understood, from the dotted grid in FIG. 1, that each two movable tube 12, 16 can be coupled at one point by means of their coupling parts 13, 17. This is illustrated in FIG. 1 by way of example for the point 18. The manner in which the movable tubes 12, 16 are guided and the structure of the coupling parts 13, 17 are explained in more detail with reference to FIGS. 3 and 4.

As already mentioned, the movable tubes 12, 16 are provided with a 90 degree tube turn 20, 21. The first coupling part 17 has a metal front surface 22 welded at the end of the tube turn 21. The second coupling part 13 has a metal front surface 23, in which a packing 24 is introduced, welded at the end of the tube turn 20. In the coupled position, the front surfaces 22, 23, are against each other. The first coupling part 17 is provided on the periphery with an annular groove 25 and the second coupling part 13 with a circular annular groove 26. A guard ring has a upper and lower leg 27 of approximately U-shaped cross section, the upper leg extends slightly less than 180 degrees around the first coupling part, as can be seen from FIG. 4, and rests in the annular groove 25. In the coupling position, the lower leg of the guard ring 27 grips into the second coupling part groove 26, the wall of which adjacent the first coupling part 17 constitutes a retaining edge. If the second coupling part 13 has already reached approximately the position 18 shown in FIG. 1, the first coupling part, if it is moved along the X axis, can become connected with the second coupling part by means of the guard ring 27.

The totally annular second coupling part 13 is surrounded by a ring 28, of rectangular cross section, fastened on the coupling part. Against the underside of the coupling part 13 and ring 28 is attached a rectangular guide piece 29, which has on parallel opposite sides guide grooves 30, 31 of rectangular cross section into which guide rails 32, 33 mesh. The guide rails are suspended on bars 35. It is clear that two guide rails 32, 33 belong to each connecting head or movable tube 12 on the Y axis.

A ring 36 is secured around the circular first coupling part 17 by means of a screwbolt 37. The guard ring 27 carries a flange extension or connecting part 39 projecting outwardly from the leg engaged with groove 25. The connecting part 39 has a hole therein which, when connected by screw 38, fastens the guard ring 27 to the ring 36. Through this arrangement, the one leg is maintained in continuous engagement with annular groove 25 and the guard ring 27 is held fast with first coupling part 17. The ring 36, for its part, is connected via four screws 40 with a rectangular guide piece 41 which, the same as the guide piece 29, has on opposite sides guide grooves for meshing of the guide rails 42, 43, (See FIG. 4). The guide rails 42, 43 are suspended via the same bar 35. Consequently, two guide rails 42, 43 for each movable tube 16 or each connecting head 21 are also required for the X direction. A chain 46 meshable with a sprocket wheel, not shown, is attached to a retaining means 44 secured on one side to the guide piece 41, at 45, and on the other side to a distant stationary point. The sprocket wheel is driven by an adequate driving motor. Rotation of the sprocket wheel results in translatory movement of the chain 46 and thus in a movement of the first coupling part 17 in the X direction. A corresponding drive is provided for the connecting head 20. A control device, not shown, can be designed in such a manner that the coupling positions shown in FIG. 1 are reached for the individual telescopic tubes 10, 14. The second coupling part 13 is prefereably first moved in position before the first coupling part 17 follows at almost the same time. The coupling ring 27, therefore, interacts with the second coupling part 13 after it has already arrived at its terminal position.

Figure 2:
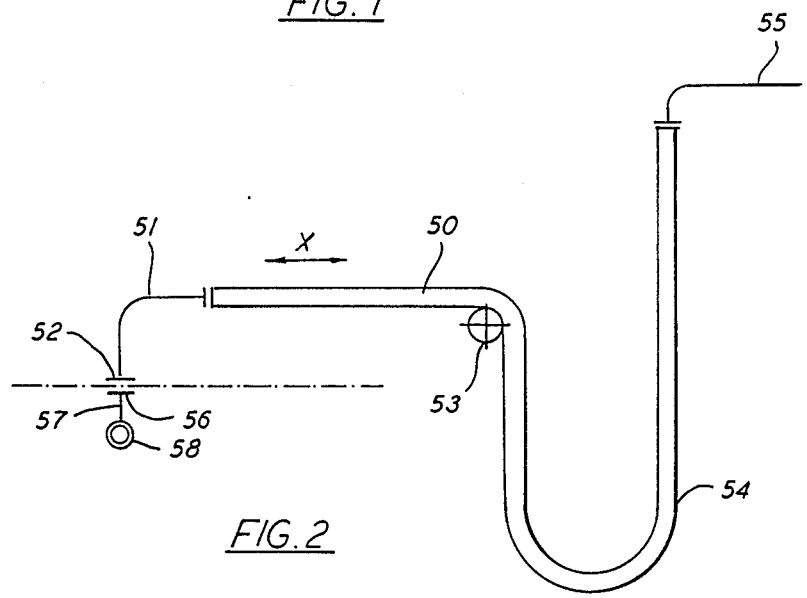
FIG. 2 shows, likewise diagrammatically, a connecting hose for a distributor apparatus according to the invention.
Figure 3:
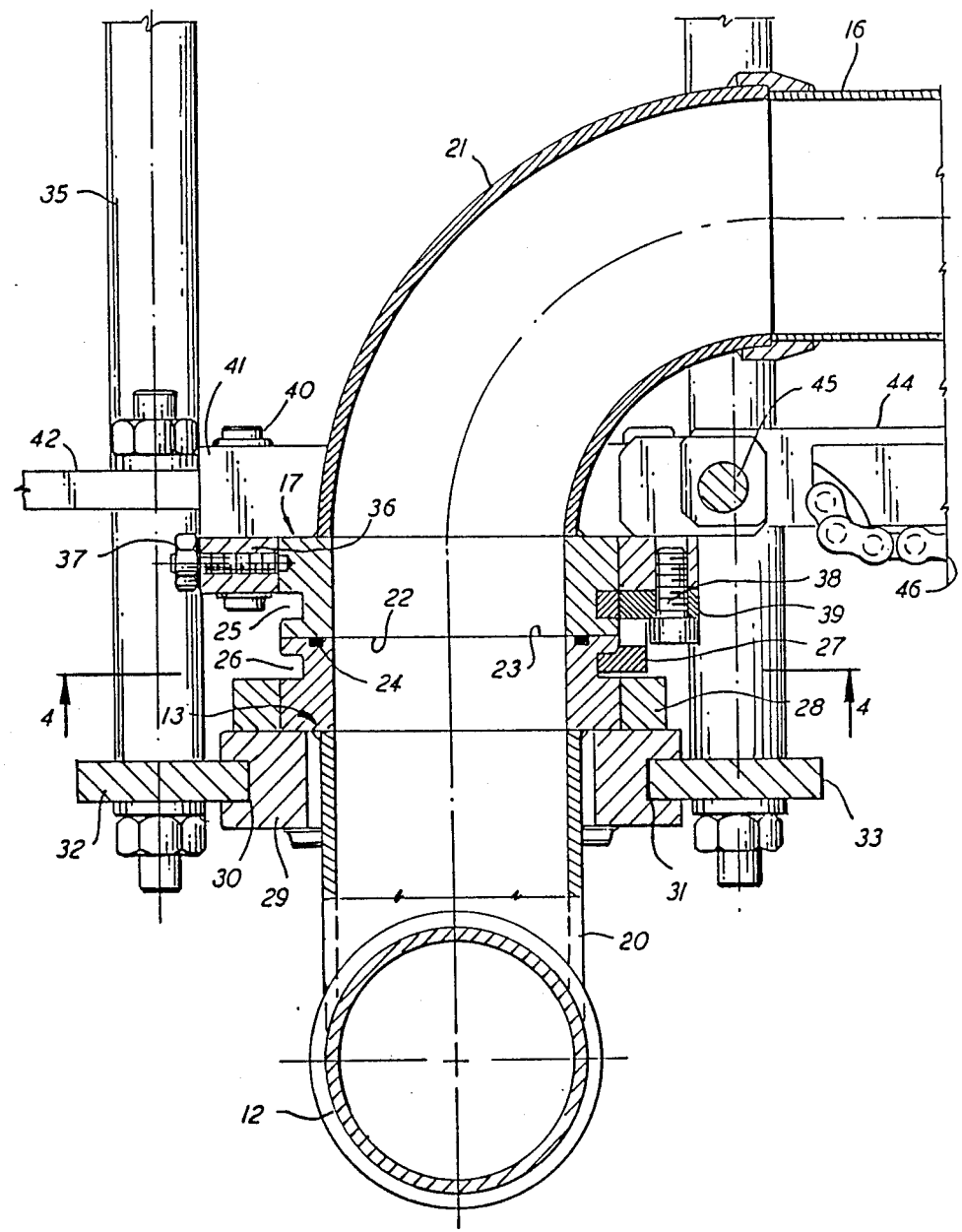
FIG. 3 shows a section through the illustration according to FIG. 1 along line 3—3, but with added structural details.
Figure 4:
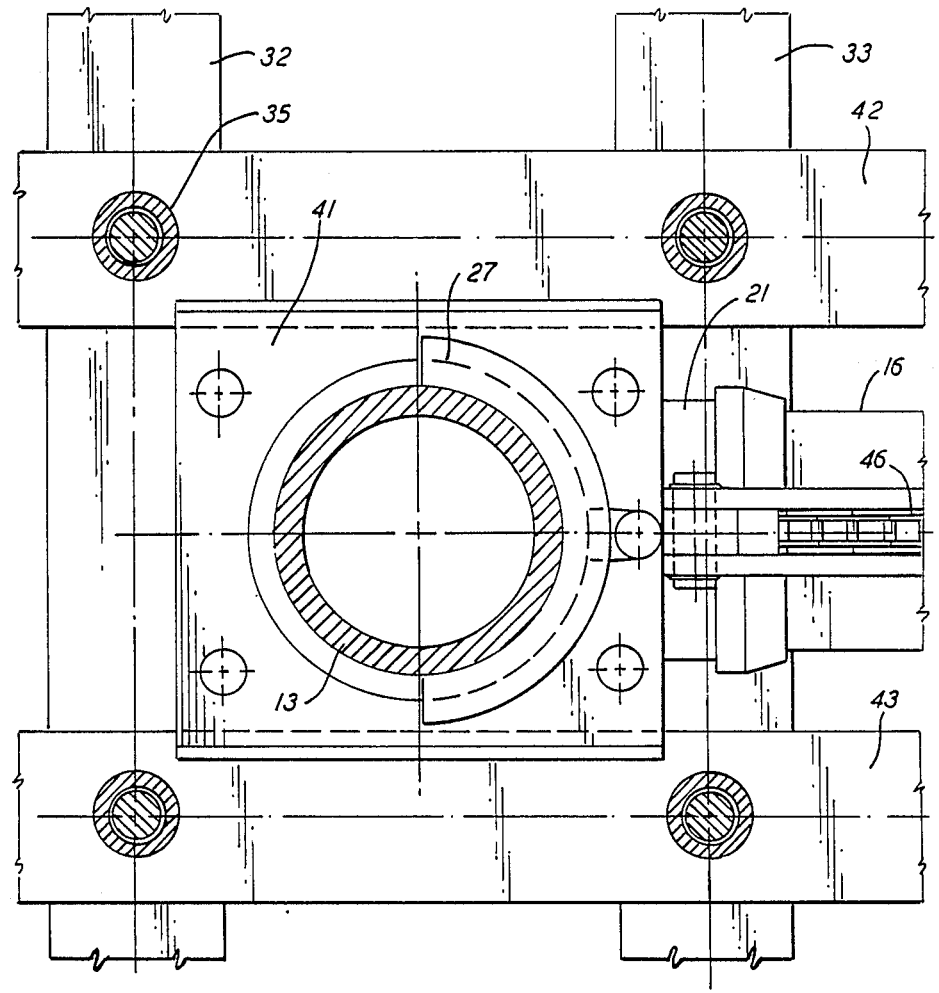
FIG. 4 shows a diagrammatic through the illustration according to FIG. 3 along line 4—4 with a few components missing to clarify the guide ring assembly.

In FIGS. 1, 3 and 4 there has been described telescopic arrangements for the movable pipeline connection. In the embodiment according to FIG. 2 the pipeline connection is formed by a hose. FIG. 2 shows a hose 50 provided, at its free end, with a 90 degree bend 51 which holds on its free end, for instance, a first coupling part 52 movable in the coupling plane in the X direction. The guide needed for this can be constructed as explained with reference to FIGS. 3 and 4. The hose 50 is guided via a loose roller 53 and forms behind the latter a loop 54. The hose is connected at the other end with a stationary pipeline 55. A driving mechanism, not shown, moves the connecting head 51 into the desired respective coupling position. 56 designates a second coupling part on the 90 degree tube bend 57 connected with a hose 58—corresponding to the hose 50. A plurality of such connecting hoses replaces the telescopic tube arrangement according to FIG. 1 in the X and Y directions. Instead of the hoses, hinged brackets can also be used disposed in the manner of arm braces, for instance, allow movement of the coupling parts.

Independently of the nature of the connecting pipelines, the distributor assembly shown is permanently scrapable.

As it can be seen from FIG. 1, it is advantageous to provide a neutral terminal position for all connecting pipelines extending along the X or Y directions.

As it can be easily understood, the distributor assemblies of the kind shown can be fully automatically controlled according to a predetermined program. A separate supervision of the formation of correct combination is not needed. Correctly controlled connecting pipelines cannot lead to defective couplings.

I claim:

1. An apparatus for selective combination of at least one first stationary pipeline for liquids with a plurality of second stationary pipelines by means of a movable pipeline connection which via detachable coupling systems interact with said first and said second stationary pipelines, wherein the coupling systems have first coupling parts and second coupling parts, the second coupling parts having a circular annular groove, the first coupling parts having a coupling annular segment with a leg extending over an arch length of 180 degrees or less and gripping into the annular groove of the second coupling part when the front surfaces of interacting coupling parts are jointly moved along approximately in a common plane, characterized in that said first and seond pipelines have each a movable connecting pipeline (10, 15), which at its free end contains a connecting head (20, 21), the connecting heads of said first pipelines being guided by means of first guides along parallel first axes and connecting heads of said second pipelines being guided by means of second guides along parallel second axes that extend perpendicularly to the first axes, and said connecting heads having terminal portions, the ends of which hold first coupling parts (17) or second coupling parts (13) in such a manner such that all the front surfaces are approximately in one coupling plane.

2. An apparatus according to claim 1, characterized in that said first and second axes respectively lie on one plane.

3. An apparatus according to claim 1, characterized in that said first and second axes are at an equal distance from each other.

4. An apparatus according to claim 1, characterized in that said connecting pipelines are hoses (50) which have a loop (54) between the corresponding stationary pipelines (55) and the connecting head (51) when said connecting head (51) is not in a fully extended position.

5. An apparatus according to claim 1, characterized in that said connecting pipelines have telescopic tube (10, 14).

6. An apparatus according to claim 1, characterized in that drive means is coupled with said connecting heads (20, 21) in a manner such that each connecting head can be moved long its adjustment axis into the respective coupling position.

7. An apparatus according to claim 6, charcterized in that said drive means moves said second coupling parts

(13) into the coupling position before the corresponding first coupling part (17).

8. An apparatus according to claim 1, characterized in that said first and second guides have parallel rails (32, 33; 42, 43) on which said connecting heads (20, 21) are guided.

9. An apparatus according to claim 1, characerterized in that said connecting pipelines comprise means for transporting the liquids between the stationary pipeline (55) and the connecting head (51).

* * * * *